United States Patent [19]
College et al.

[11] Patent Number: 6,094,821
[45] Date of Patent: Aug. 1, 2000

[54] OPTIMIZED STRIPPING BLADES

[75] Inventors: David Alan College, Annville; Douglas Sebastian Pfautz, Landisville; David Joseph Erb, Harrisburg; Eric Kootte, Shermans Dale, all of Pa.

[73] Assignee: The Whitaker Corporation, Wilmington, Del.

[21] Appl. No.: 09/249,757

[22] Filed: Feb. 16, 1999

Related U.S. Application Data

[63] Continuation-in-part of application No. 09/108,498, Jul. 1, 1998.

[51] Int. Cl.[7] .................................................. H02G 1/12
[52] U.S. Cl. ................................................ 30/90.1; 81/9.4
[58] Field of Search ........................... 30/90.1, 357, 353; 83/947, 857; 81/9.4, 9.41

[56] References Cited

U.S. PATENT DOCUMENTS

| | | | |
|---|---|---|---|
| 3,527,124 | 9/1970 | Ullman | 81/9.51 |
| 4,577,405 | 3/1986 | Butler | 30/90.1 |
| 4,972,582 | 11/1990 | Butler | 30/90.1 |
| 5,361,489 | 11/1994 | Vatel | 81/9.51 X |
| 5,414,931 | 5/1995 | Wollermann | 30/90.1 |
| 5,924,200 | 7/1999 | College | 30/90.1 |

OTHER PUBLICATIONS

AMP Drawing No. 356553, "Blade, Stripping Universal," one sheet; Oct. 8, 1997; AMP Incorporated, Harrisburg, PA.
AMP Drawing No. 844765, "Blade, Stripping," one sheet; Sep. 25, 1996; AMP Incorporated, Harrisburg, PA.

*Primary Examiner*—M. Rachuba
*Assistant Examiner*—Dominic Troiano

[57] ABSTRACT

A wire stripping apparatus for stripping insulation material (48) from an insulated electrical conductor (50) includes a first stripping blade (40) having a first cutting tip configuration (44, 52, 56, 60, 64, 68, 72) and a second stripping blade (42) supported in opposing relation to the first stripping blade (40) having a second set of cutting tip configuration (46, 54, 58, 62, 66, 70, 74) different from the first set of cutting tip configuration (44, 52, 56, 60, 64, 68, 72) encompasses and uniformly strips an insulation slug from a periphery of the insulated conductor (50).

17 Claims, 5 Drawing Sheets

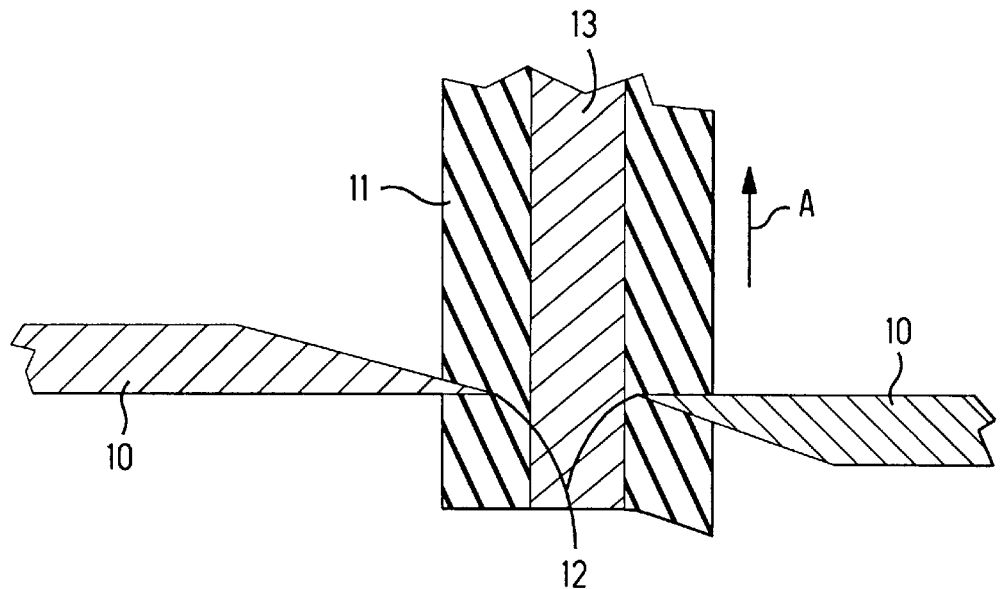
FIG. 1
Prior Art
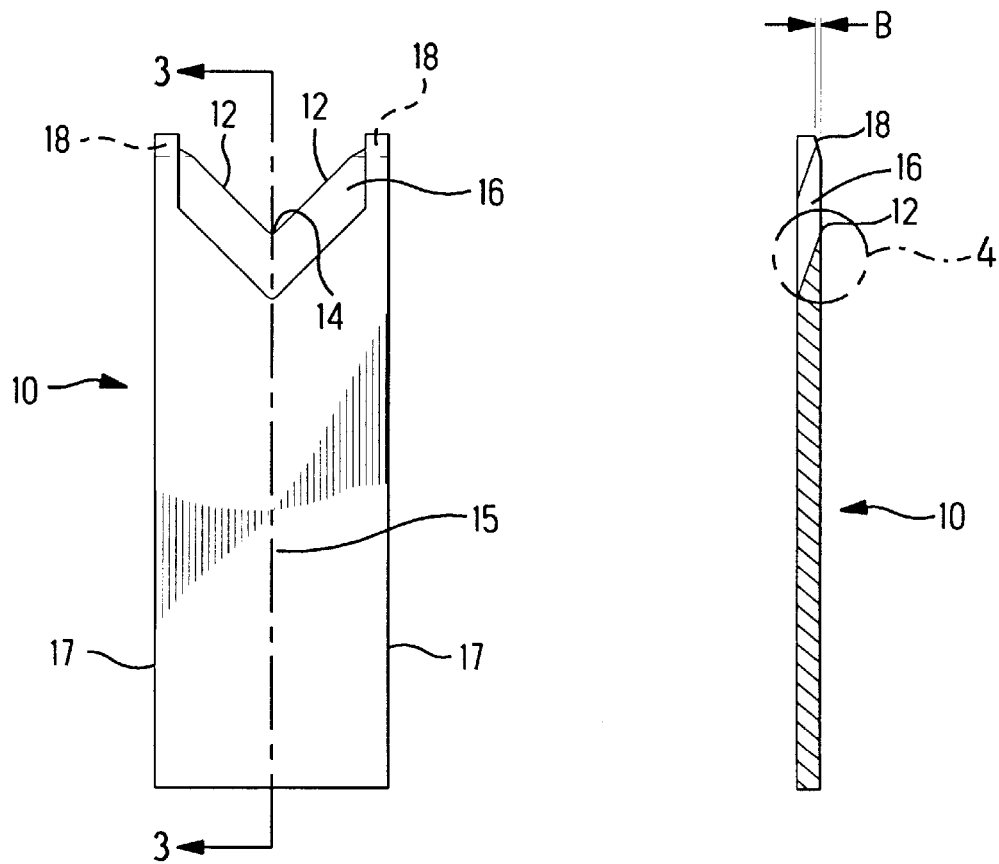
FIG. 2
Prior Art
FIG. 3
Prior Art

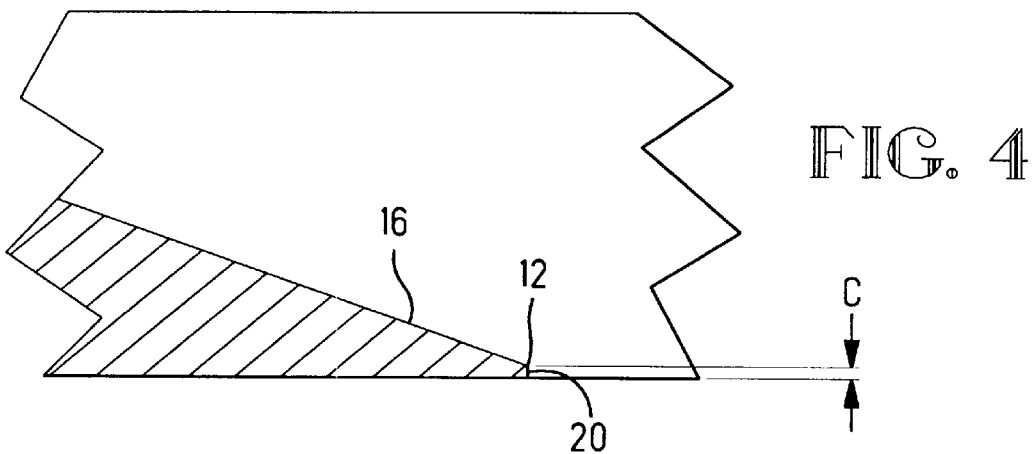
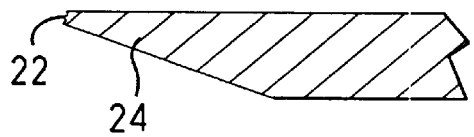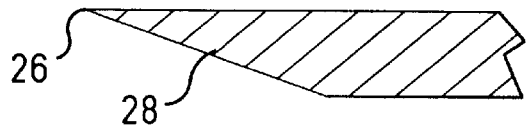
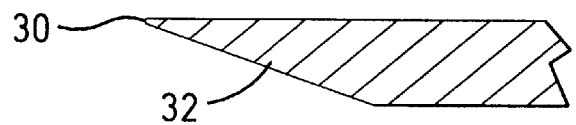
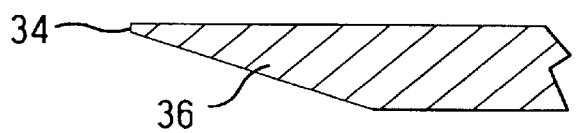

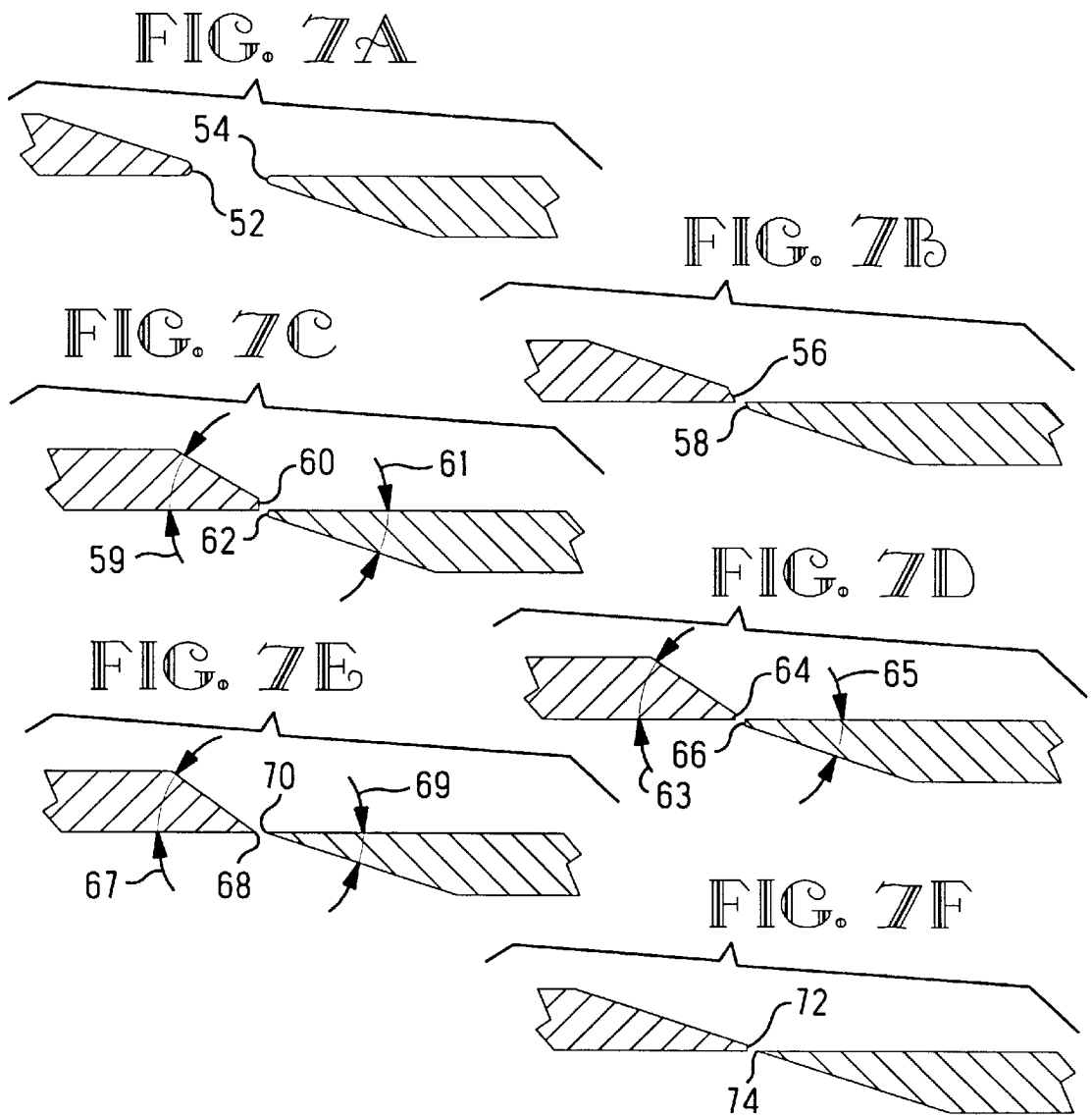

OPTIMIZED STRIPPING BLADES

This application is a Continuation-In-Part of Application Ser. No. 09/108,498 filed Jul. 1, 1998.

This invention relates generally to the field of insulation removal as by mechanical stripping from electrical conductors, and more particularly to stripping blades for optimizing insulation material removal with even penetration about the periphery of the conductor to be stripped of the insulation material.

BACKGROUND OF THE INVENTION

In the electrical connector art, insulation material often must be removed from a longitudinal extent of an electrical conductor such as an insulated electrical conductor prior to assembly of electrical connectors to stripped and exposed conductor or wire lengths. One well known and widely used method for mechanically stripping insulation material is with a pair of opposed bypassing stripping blades for stripping insulation from an electrical conductor such as a wire, such wire stripping performed in automated lead making apparatus, bench-mounted or hand-held apparatus. According to this method, the opposed pair of stripping blades exerts a wedging-type displacement action along the length of the wire to strip a selected annular length of insulation material from the wire. Thus, an increased depth in the cut, due to for example a thicker insulation or a less acute angular cut, results in a greater "wedging" effect in the insulation, thereby requiring displacement of a greater amount of the insulation material. This "wedging" action thus impedes penetration of the blade and hampers achievement of a uniform cut of the insulation material. Moreover, when a cut is made near the end of the conductor, the blade on one side of the wire tip may more easily and disproportionately displace the insulation material since there is no counter force applied against that conductor end to resist insulation movement.

Thus, several important problems exist in the related art affecting uniform stripping of insulation material when the stripping blades do not uniformly penetrate to substantially the same insulation depth with respect to the conductor. First, if one blade is so deep as to almost contact the electrical conductor while the second opposing blade extends to a more shallow depth, further cooperating blade closure cannot be effected without risking damage to the conductor, thereby resulting in an uneven, non-uniform stripping action. See, for example, Prior Art FIG. 1 showing a pair of opposed uniformly-shaped and finished stripping blades 10 inserted to significantly non-uniform depths through opposing walls of the insulation material 11. The sharp cutting edges 12 of the blade tips are intended to cut and then strip away a portion (insulation slug) of the insulation material 11 encasing the center conductor 13 as the conductor is moved in the direction indicated by arrow A. A further view of a single one of the stripping blades 10 is shown in FIGS. 2–4, whereby the stripping blade 10 includes two inwardly acute angled cutting surfaces 16 converging at a vertex 14 positioned on a longitudinal axis 15. The cutting edges 12 extend along the acute angled cutting surfaces 16 from the longitudinal axis 15 to intermediate extents inwardly of transverse edges 17 of the stripping blade 10. With particular reference to FIGS. 3 and 4, the stripping blade 10 includes an angular flat 18 (having a lateral thickness indicated by arrow B), at the leading outboard edges of the blade 10, and a square flat 20 (having a lateral thickness indicated by arrow C) extending the full length of both cutting edges 12. As previously described, opposing stripping blades 10 having the same cutting parameters typically result in a non-uniform cut of the insulation material. One of each exemplary blade edge is shown in FIG. 5, including a sharp edge 26 of stripping blade 28 shown in FIG. 5(b), a stropped edge 30 of stripping blade 32 shown in FIG. 5(c), and a flat edge 34 of stripping blade 36 shown in FIG. 5(d). It will be understood that matching pairs of such stripping blades 28, 32, 36 are known for use according to the related art. Thus, irrespective of the type of stripping blade and edge selected when used in matched pairs, when blade closure is uneven, some of the insulation on the more shallow cut side will be torn away rather than cut away as would occur with the opposing deeper cutting stripping blade 28, 32, 36. This tearing effect increases insulation slug pull-off force, and also results in a ragged insulation end, which more likely will vary from the desired theoretical, cut plane. Excess strip length variation also increases the chance of untrimmed insulation remaining in the portion of wire to be crimped in a terminal to be applied to the conductor or wire end. In those instances where the insulation wall is very thin, uneven penetration of the stripping blades prevents solid engagement by one blade, thereby hindering slidable removal of the partially severed insulation annulus comprising the insulation slug. A further problem identified in the prior art is insulation compression that results in slippage between the stripping blades and also prevents complete stripping. Furthermore, uneven penetration by the opposing stripping blades will cause the conductor or wire to be deflected from the intended wire path during cutting, thus causing loss of a cut/tear plane having an orientation normal to the conductor, and also detrimentally resulting in a portion of the insulation material being captured by a crimp portion of a connector to be joined to the wire.

According to the related art, it is known that cutting and stripping operations easily break the extremely thin edge of a perfectly sharp blade, as shown in FIG. 5(a). However, depending on grain structure of the base metal and loading conditions on the blade, the breaking tip material may rip adjacent material from the blade. This ripping or chipping is more likely to occur when the blade tip is loaded in bending as is typical of the case when a cooperating pair of stripping blades pull an insulation slug off of a conductor end. Further blade edge deterioration in this uncontrolled fashion results in an uneven and unpredictable cutting profile and the service life of the blade is rapidly diminished. It is known, however, that if this sharp and fragile blade edge is slightly dulled in a usable configuration, its service life may be significantly enhanced. One method of creating this slightly dull edge is by stropping, either manually or by machine so that the finished cutting edge has a very small flat or radius at the tip of the cutting edge instead of a converging sharpened edge, as shown in FIGS. 5b and 5c. If the flat or radius is small enough, on the order of a few thousandths of an inch, the blade will still cut adequately in many applications. Notwithstanding this improvement, however, if the same dulling feature is applied to the edges of opposing stripping blades to provide the same cutting features on both blades, the prior art problem of non-uniform stripping described above still remains.

Accordingly, there remains a need in the art for an apparatus and method of providing stripping blades, which when paired for cooperating bypass stripping action, achieves uniform stripping of insulation material from electrical conductors and overcomes the related art problem of non-uniform stripping. Specifically, it is desired to provide cooperating stripping blades and a method of use thereof to substantially equalize the depth and quality of cut by the stripping blades to achieve uniform and consistent stripping of insulation material from an insulated conductor.

SUMMARY OF THE INVENTION

The stripping blades of the present invention include paired cooperating blades having asymmetrical cutting edges including variations in blade angle, blade flat width and sharpness. According to the invention, the penetration ability of each blade in an asymmetrical pairing will together provide an equal overall wedging effect to the insulation slug to be cut and stripped from an insulation-encased conductor.

Embodiments of the stripping blades of the present invention will now be described by way of example with reference to the accompanying drawings.

DESCRIPTION OF THE FIGURES

FIG. 1 is a cross-sectional view of prior art stripping blades arranged in opposing bypass relation and inserted into an insulated conductor to be stripped of its insulation material prior to a stripping operation, showing a non-equal insertion depth of the blade tips;

FIG. 2 is a plan view of an exemplary prior art stripping blade showing a pair of converging cutting edges;

FIG. 3 is a side view of FIG. 2 taken along the section lines 3—3 showing a partial cross-section of the cutting blade;

FIG. 4 is an enlarged sectional view of FIG. 3, showing a flat blade tip;

FIG. 5 shows several blade tip embodiments, all of which are used in matching pairs according to the prior art;

FIG. 6 is an exemplary cross-sectional view of a pair of asymmetrical stripping blades inserted into an insulated conductor to be stripped of its insulation material prior to a stripping operation, showing equal insertion depth of the blade tips;

FIG. 7 shows several blade tip embodiments, all of which are used in asymmetrical pairs according to the present invention;

DESCRIPTION OF AN EMBODIMENT OF THE INVENTION

Figure 8:
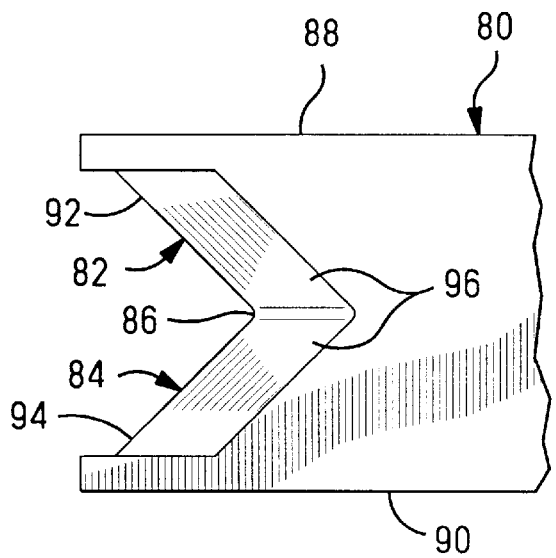
FIG. 8 is a plan view of a portion of a cutting and stripping blade showing another embodiment of the present invention.

Referring now to FIGS. 6–7, the inventors of the present invention have discovered that the paired use of cooperating stripping blades 40, 42 having asymmetrical blade tips 44, 46, as will be more fully described below, essentially corrects the related art tendency of non-uniform penetration of the insulation material surrounding an electrical conductor by extending to and cutting substantially evenly an insulation material annulus 48 encasing a center conductor 50 prior to the insulated conductor being drawn through the stripper blades 40, 42 in the direction indicated by arrow D. Thus, providing one cutting edge with a tip that is dulled or blunted relative to its opposed cooperating stripper blade achieves substantially uniform blade penetration and hence a consistent cut/tear plane substantially perpendicular to the center conductor with significant reduction of ragged insulation edges and reduced insulation slug pull-off force. More particularly, this improvement is achieved by pairing dissimilar blade tip embodiments, all of which are used in asymmetrical pairs according to the present invention. According to the invention, the blades may be configured for linear or rotary cutting action. Note that the cutting and stripping blades described herein are intended to be utilized in opposing pairs of blades arranged in bypass relation in a manner similar to the prior art cutting and stripping blades shown in FIG. 1. That is, the two stripping blades have mutually facing flat surfaces that slidingly engage as portions of the two blades pass each other when severing a wire or when cutting the insulation of the wire.

Specifically, each of the asymmetrically paired cutting and stripping blades have cutting tip configuration which include dissimilar non-sharp cutting edges having a flat width or radius wherein the flat or radius of one of the stripping blades is different from that of the opposing stripping blade, unlike the related art in which opposing stripping blades 10 have the same cutting tip configuration thus resulting in a non-uniform cut of the insulation material. According to the invention and as shown in FIG. 7, various combinations of stripping blades having dissimilar cutting edges may be utilized to provide the dissimilar cutting tip configuration necessary to achieve the desired uniform cutting and stripping action. For example, two opposing stripping blades having non-sharp cutting edges 52, 54 with dissimilar cutting edge radii may be combined as shown in FIG. 7(a), two opposing stripping blades having non-sharp cutting edges 56, 58 with varying flat widths may be combined as shown in FIG. 7(b), and two opposing stripping blades having non-sharp cutting edges 60, 62 with unequal flats and varying rake angles 59 and 61 may be combined as shown in FIG. 7(c). Additional combinations include two opposing stripping blades having cutting edges 64, 66 with equal flats but varying rake angles 63 and 65 as shown in FIG. 7(d), two opposing stripping blades having cutting edges 68, 70 with sharp edges with varying rake angles 67 and 69 as shown in FIG. 7(e), and two opposing stripping blades having cutting edges 72, 74 with one sharp edge combined with a flat edge as shown in FIG. 7(f). All of these various combinations of stripping blades will effectively achieve the desired uniform stripping of insulation material from electrical conductors.

Another problem encountered with prior art cutting and stripping blades is their vulnerability to damage when an electrical terminal is inadvertently placed between the opposing stripping and cutting blades during operation. The relatively sharp cutting edges, when encountering the metal terminal, tend to crack or chip rendering the blades dull or completely unusable. Since the electric terminal usually engages the areas of the cutting edges outwardly of the vertex first, these areas are most vulnerable to damage. The present invention effectively deals with this problem by making these vulnerable areas stronger. This is accomplished by varying the non-sharp portion of the cutting edge along it length, as shown in FIGS. 8 through 15. As in the above discussion, each of the asymmetrically paired cutting and stripping blades have cutting tip configuration which include cutting edges having a flat width, a radius, or a rake angle wherein the flat, radius, or rake angle of one of the stripping blades is different from that of the opposing stripping blade. Further, only a single cutting and stripping blade will be described, although it will be understood that it is intended that these blades be used in opposed pairs of blades in bypass relation where the cutting tip configuration of the two blades are different.

Figure 9:
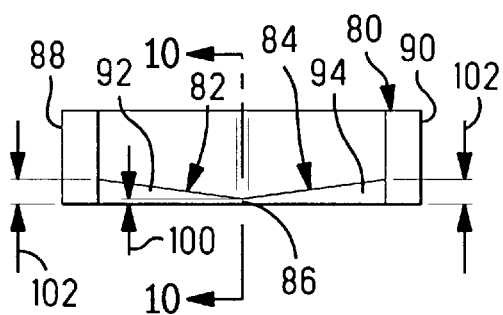
FIG. 9 is an end view of the blade shown in FIG. 8.
Figure 10:
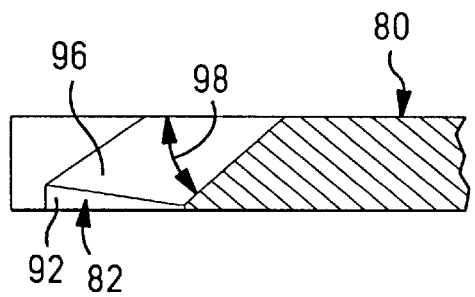
FIG. 10 is a cross-sectional view taken along the section lines 10—10 in FIG. 9.

In the case where the cutting edges include flats formed thereon, as shown in FIGS. 8, 9, and 10, a cutting and stripping blade 80 has a left cutting edge 82 and a right cutting edge 84 which diverge from a vertex 86 and extend outwardly toward left and right edges 88 and 90, respectively. A non-sharp area consisting of a left flat 92 is formed along a portion of the left cutting edge co and another non-sharp area consisting of a right flat 94 is formed along a portion of the right cutting edge 84, as best seen in FIGS. 9 and 10. The left and right cutting edges 82 and 84 are formed by the acute compound angled surface 96 having a standard rake-back angle 98. The left and right flats 92 and 94 comprise the cutting tip configuration of the blade 80. The left and right flats 92 and 94 vary in width from a minimum width 100 at the vertex 86 to a maximum width 102 near the left and right edges 88 and 90, respectively. Note that, in the present example, the flats 92 and 94 run substantially the entire length of their respective cutting edges 82 and 84, however, these flats may be formed on only a portion of the length of these cutting edges. It will be appreciated by those skilled in the art that the areas of the left and right cutting edges near the outer sides of the cutting and stripping blade 80 are stronger and less likely to break when encountering a foreign object, such as a metal terminal, than the areas near the vertex where the flat is appreciable more narrow, as shown in FIG. 9.

Figure 11:
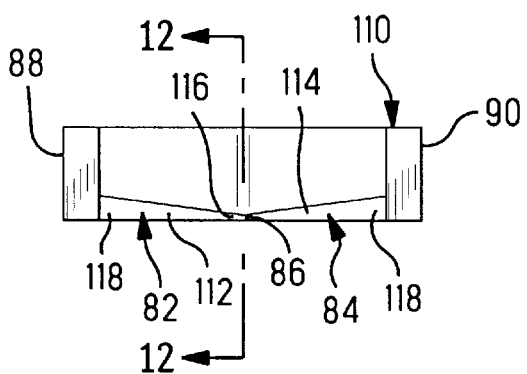
FIG. 11 is an end view of the blade shown in FIG. 8 showing another embodiment of the invention.
Figure 12:
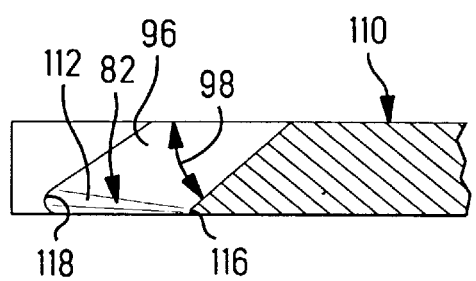
FIG. 12 is a cross-sectional view taken along the section lines 12—12 in FIG. 11.

FIGS. 11 and 12 illustrate the case where the cutting edges include a radius. There, a cutting and stripping blade 110 is shown having left and right cutting edges 82 and 84 which diverge from a vertex 86 and extend outwardly toward left and right edges 88 and 90, respectively, similar to the blade 80. The left and right cutting edges 82 and 84 are formed by the acute compound angled surface 96 having a standard rake-back angle 98. A non-sharp area consisting of a left radius 112 is formed along a portion of the left cutting edge 82 and another non-sharp area consisting of a right radius 114 is formed along a portion of the right cutting edge 84, as best seen in FIG. 11 and 12. The left and right radiuses 112 and 114 comprise the cutting tip configuration of the blade 110. The left and right radiuses 112 and 114 vary from a minimum radius 116 at the vertex 86 to a maximum radius 118 near the left and right edges 88 and 90, respectively. Note that, in the present example, the radiuses 116 and 118 run substantially the entire length of their respective cutting edges 82 and 84, however as with the flats of the blade 80, these radiuses may be formed on only a portion of these cutting edges. Further as with the blade 80, it will be appreciated that the areas of the left and right cutting edges near the outer sides of the cutting and stripping blade 110 are stronger and less likely to break when encountering a foreign object, such as a metal terminal, than the areas near the vertex where the radiuses are appreciable smaller, as shown in FIG. 12.

Figure 13:
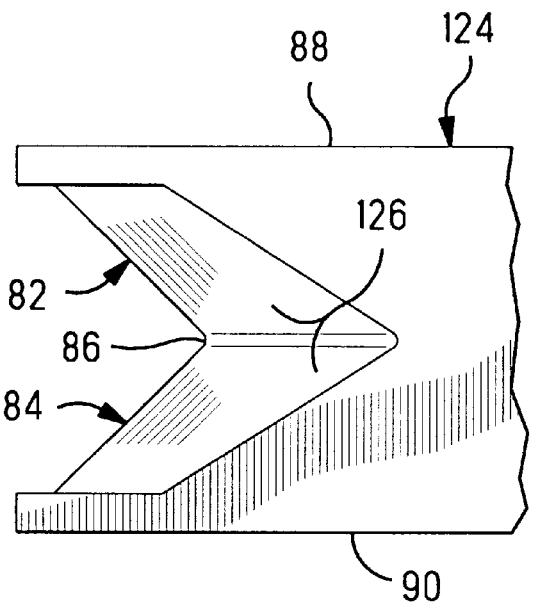
FIG. 13 is a plan view of a portion of a cutting and stripping blade showing another embodiment of the present invention.
Figure 14:
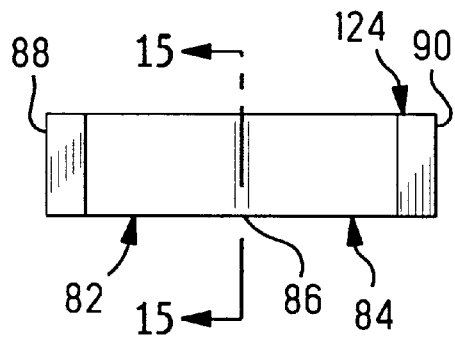
FIG. 14 is an end view of the blade shown in FIG. 13.
Figure 15:
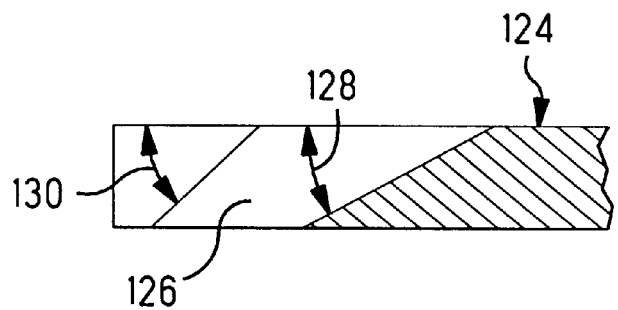
FIG. 15 is a cross-sectional view taken along the section lines 15—15 in FIG. 14.

FIGS. 13, 14, and 15 illustrate the case where the cutting edges include a varying rake-back angle. There, a cutting and stripping blade 124 is shown having left and right cutting edges 82 and 84 which diverge from a vertex 86 and extend outwardly toward left and right edges 88 and 90, respectively, similar to the blade 80. The left and right cutting edges 82 and 84 are formed by the acute compound angled surface 126. A non-sharp area formed by a steeper than normal rake-back angle is disposed along a portion of the left cutting edge 82. The actual angle of the rack-back varies from an angle 128 near the vertex 86 to a steeper angle 130 near the left and right edges 88 and 90, respectively. Similarly, another non-sharp area formed by a steeper than normal rake-back angle is disposed along a portion of the right cutting edge 84, in a manner similar to the left cutting edge 82. The steep and steeper rake-back angles comprise the cutting tip configuration of the blade 124. Note that, in the present example, the rake-back angles from 128 to 130 run substantially the entire length of their respective cutting edges 82 and 84, however as with the flats of the blade 80, these rake-back angles may be formed on only a portion of these cutting edges. Further as with the blade 80, it will be appreciated that the areas of the left and right cutting edges near the outer sides of the cutting and stripping blade 124 are stronger and less likely to break when encountering a foreign object, such as a metal terminal, than the areas near the vertex where the rake-back angle is appreciable less steep, as shown in FIG. 15.

It will be apparent to the skilled artisan that other combinations of stripping blades with dissimilar cutting tips may be achieved according to the teachings of the present invention, the cutting tips varying in sharpness, rake angle, flat finish, flat width, and varying radii in the case of rounded cutting tips, such combinations applying the dull blade to the side of the insulated conductor where penetration is normally better due to easier wedging to substantially equalize insulation penetration and provide a square cut. Accordingly such modifications may be made without departing from the spirit and scope of the present invention and equivalents thereof, in view of the appended claims.

What is claimed is:

1. A wire stripping apparatus for stripping insulation material from an insulated electrical conductor, comprising:
   first and second stripping blades each being substantially V-shaped, said blades being arranged in opposing bypass relation to encompass a periphery of said insulated electrical conductor;
   said first stripping blade having a first cutting edge; and
   said second stripping blade having a second cutting edge, said first and second cutting edges being assymetric with respect to each other.

2. The apparatus according to claim 1 wherein said first cutting edge includes a tip having a first radius and said second cutting edge includes a tip having a second radius that is dimensionally different than said first radius.

3. The apparatus according to claim 1 wherein said first cutting edge includes a tip having a first flat and said second cutting edge includes a tip having a second flat that is dimensionally different than said first flat.

4. The apparatus according to claim 1 wherein said first cutting edge includes a tip having a first rake back angle and said second cutting edge includes a tip having a second rake back angle that is dimensionally different than said first rake back angle.

5. The apparatus according to claim 1 wherein said first cutting edge includes a tip having a radius and said second cutting edge includes a tip having a flat edge.

6. The apparatus according to claim 1 wherein said first cutting edge includes a sharp tip and said second cutting edge includes a non-sharp tip.

7. The apparatus according to claim 1 wherein said first stripping blade includes a first pair of left and right cutting edges having a first cutting tip configuration associated therewith, and said second stripping blade includes a second pair of left and right cutting edges having a second cutting tip configuration associated therewith, said left and right cutting edges of each of said first and second stripping blades diverging from a respective vertex and extending outwardly toward respective opposite edges thereof.

8. The apparatus according to claim 7 wherein said first cutting tip configuration comprises a first left non-sharp area disposed along a portion of said left cutting edge and a first right non-sharp area disposed along a portion of said right cutting edge of said first pair of cutting edges, and said second cutting tip configuration comprises a second left non-sharp area disposed along a portion of said left cutting edge and a second right non-sharp area disposed along a portion of said right cutting edge of said second pair of cutting edges, wherein said first and second left non-sharp areas are different than each other, and said first and second right non-sharp areas are different than each other.

9. The apparatus according to claim 8 wherein said non-sharp area of either said first cutting tip configuration and said second cutting tip configuration comprises a radius formed on said portion of said cutting edge.

10. The apparatus according to claim 8 wherein said non-sharp area of either said first cutting tip configuration and said second cutting tip configuration comprises a flat formed on said portion of said cutting edge.

11. The apparatus according to claim 7 wherein said first cutting tip configuration comprises a first left rake-back angle disposed along a portion of said left cutting edge and a first right rake-back angle disposed along a portion of said right cutting edge of said first pair of cutting edges, and said second cutting tip configuration comprises a second left rake-back angle disposed along a portion of said left cutting edge and a second right rake-back angle disposed along a portion of said right cutting edge of said second pair of cutting edges, wherein said first left rake-back angle and said first right rake-back angle are both relatively smaller than both said second left rake-back angle and said second right rake-back angle.

12. The apparatus according to claim 11 wherein said left and right rake-back angles of one of said first and second cutting tip configurations is relatively smaller along said portion adjacent said vertex and relatively larger along said portion extending outwardly toward said opposite edges thereof.

13. A wire stripping apparatus for stripping insulation material from an insulated electrical conductor, comprising:

a first stripping blade having a first pair of left and right cutting edges, including a first left rake-back angle disposed along a portion of said left cutting edge and a first right rake-back angle disposed along a portion of said right cutting edge of said first pair of cutting edges; and a second stripping blade supported in opposing relation to said first stripping blade having a second pair of left and right cutting edges, including a second left rake-back angle disposed along a portion of said left cutting edge and a second right rake-back angle disposed along a portion of said right cutting edge of said second pair of cutting edges, said left and right cutting edges of each of said first and second stripping blades diverging from a respective vertex and extending outwardly toward respective opposite edges, and each left and right cutting edge having a respective left and right non-sharp area disposed along a portion thereof, wherein said non-sharp area of each left and right cutting edge is less non-sharp near said vertex than near said opposite edges, and wherein said left and right rake-back angles of one of said first and second pairs of cutting edges are relatively smaller along said portion adjacent said vertex and relatively larger along said portion extending outwardly toward said opposite edges.

14. The apparatus according to claim 13 wherein said non-sharp area of said left and right cutting edges of either said first and second stripping blades comprises a radius formed on said portion of said cutting edge.

15. The apparatus according to claim 14 wherein said radius is relatively smaller along said portion adjacent said vertex and relatively larger along said portion extending outwardly toward said opposite edges.

16. The apparatus according to claim 13 wherein said non-sharp area of said left and right cutting edges of either said first and second stripping blades comprises a flat formed on said portion of said cutting edge.

17. The apparatus according to claim 16 wherein said flat is relatively smaller along said portion adjacent said vertex and relatively larger along said portion extending outwardly toward said opposite edges.

* * * * *